United States Patent
McCloghrie et al.

(10) Patent No.: US 6,304,901 B1
(45) Date of Patent: Oct. 16, 2001

(54) MULTIPLE VLAN ARCHITECTURE SYSTEM

(75) Inventors: Keith McCloghrie, San Jose; Bernard R. James, Mountain View; Christopher James, Boulder Creek; Norman W. Finn, San Jose, all of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/667,296

(22) Filed: Sep. 22, 2000

Related U.S. Application Data

(63) Continuation of application No. 09/580,384, filed on May 26, 2000, which is a continuation of application No. 09/277,329, filed on Mar. 26, 1999, now Pat. No. 6,219,699, which is a continuation of application No. 08/582,074, filed on Jan. 2, 1996, now Pat. No. 6,035,105.

(51) Int. Cl.[7] ............... G06F 15/163; G06F 15/177; G06F 13/42; G06F 13/40; H04L 12/56
(52) U.S. Cl. ............... 709/221; 709/236; 709/242; 370/392; 370/432; 370/469; 370/471; 370/509; 370/351; 712/28; 712/30
(58) Field of Search ............... 370/509, 389, 370/401, 402, 351, 395, 432, 392, 469, 230, 449, 242, 390, 407, 471, 474; 709/242, 233, 236, 231, 203, 217, 221, 225, 224; 712/24, 28, 29, 30, 31

(56) References Cited

U.S. PATENT DOCUMENTS 5,251,205 * 10/1993 Callon et al. ............... 370/392
5,684,800 * 11/1997 Dobbins et al. ............... 370/401

* cited by examiner

Primary Examiner—Daniel H. Pan
(74) Attorney, Agent, or Firm—Cesari and McKenna, LLP

(57) ABSTRACT

A system in which a single VLAN architecture spans multiple VLAN transport protocols and technologies, including a method and system in which multiple different VLANs may be combined in a single enterprise network. Each LAN-switch in the system identifies each frame with an identifier, and associates that identifier with particular VLAN identifiers for each type of VLAN technology. When a frame is bridged or routed from a first type of VLAN to a second type of VLAN, the first VLAN encapsulation is removed and the second VLAN encapsulation is added, with appropriate change in the VLAN identifier for the frame or packet. The identifier may also be implicit for the frame, such as when a particular set of sender's MAC addresses are identified with a particular VLAN. Individual VLANs, of whatever architecture, may be added, configured or reconfigured, modified, or deleted, using control tools associated with the multiple VLAN architecture system. Individual ports may be associated with particular VLANs, or may be designated "dynamic" so that frames or packets associated with those ports are associated with particular VLANs in response to source or destination addresses or other information.

27 Claims, 4 Drawing Sheets

VERSION (8 BITS):
 VERSION NUMBER: 0X01
CODE (8 BITS):
 TYPE OF MESSAGE: 0X01 - SUMMERY-ADVERT
                  0X02 - SUBSET-ADVERT
                  0X03 - ADVERT-REQUEST
FOLLOWER (1 BYTE):
 NUMBER OF SUBSET-ADVERTS MESSAGES WHICH FOLLOW THIS

MULTIPLE VLAN ARCHITECTURE SYSTEM

CROSS-REFERENCE TO RELATED APPLICATIONS

This application is a continuation of copending U.S. patent application Ser. No. 09/580,384 filed May 26, 2000 entitled "Multiple VLAN Architecture System," which, in turn, is a continuation of U.S. patent application Ser. No. 09/277,329 filed Mar. 26, 1999, now U.S. Pat. No. 6,219,699, having the same title, which, in turn, is a continuation of U.S. patent application Ser. No. 08/582,074 (now U.S. Pat. No. 6,035,105) filed Jan. 2, 1996 having the same title. Each of said copending applications and U.S. Pat. No. 6,035,105 are hereby incorporated herein by reference.

BACKGROUND OF THE INVENTION

1. Field of the Invention

This invention relates to a multiple VLAN architecture system.

2. Description of Related Art

When interconnecting computers and other devices in a network, it has become desirable to create "virtual local area networks" (VLANs), in which all devices coupled to a VLAN receive all frames or packets which are universally addressed (whether by broadcast, multicast, or some other technique) on that VLAN, and in which all frames or packets which are universally addressed by a device on a VLAN are not distributed to devices outside the VLAN. However, there is more than one type of VLAN transport protocol technology which has been proposed and come to be accepted in the art. For example, VLAN technologies which are now common include LANE (for ATM LAN-Emulation), IEEE Standard 802.10, and various proprietary schemes such as ISL (for cisco Catalyst™ Inter-Switch Links).

One problem which has arisen in the art is that it is desirable to couple devices on a single VLAN even though those devices have been designated or configured for different VLAN transport protocols or technologies. Aspects of this problem are that it is desirable for devices to be on the same VLAN even though they are not physically proximal to each other or cannot be coupled to the same switching device (for example, due to limitations imposed by respective media speed), that is desirable for devices (or networks comprising those devices) to be configurable so that a device may be moved from one VLAN to another VLAN with ease, and that it is desirable for a device to be coupled to different VLANs at different times or to multiple VLANs at one time.

Accordingly, it would be advantageous to provide a multiple VLAN architecture system, such as one which is capable of operating in a network environment with multiple different VLANs and multiple different VLAN technologies.

The following U.S. patent(s) may be pertinent:

U.S. Pat. No. 5,394,402, issued Feb. 28, 1995, in the name of Floyd E. Ross, titled, "Hub For Segmented Virtual Local Area Network With Shared Media Access".

This patent discloses a hub for a segmented VLAN system. The hub received packets from one of the devices, called "end stations" which are coupled thereto, and forwards them using a backbone network to other such hubs, for forwarding to other devices coupled to the same VLAN. Essentially, the hub serves to bridge packets among its ports such that packets are bridged only to those other devices which are on the same VLAN.

The pertinence of the related art will also be apparent to those skilled in the art after perusal of this application.

SUMMARY OF THE INVENTION

This invention provides a system in which a single VLAN architecture spans multiple VLAN transport protocols and technologies, including a method and system in which each VLAN may span multiple different VLAN technologies. Each LAN-switch in the system identifies each frame with an identifier, and associates that identifier with particular VLAN identifiers for each type of VLAN architecture. When a frame is bridged or routed from a first type of VLAN to a second type of VLAN, the first VLAN encapsulation is removed and the second VLAN encapsulation is added, with appropriate change in the VLAN identifier for the frame or packet. The identifier may also be implicit for the frame, such as when a particular set of sender's MAC addresses are identified with a particular VLAN.

In a preferred embodiment, individual VLANs, which may span the set of multiple VLAN technologies, may be added, configured or reconfigured, modified, or deleted, using control tools associated with the multiple VLAN architecture system. Individual ports may be associated with particular VLANs, or may be designated "dynamic" so that frames or packets associated with those ports are associated with particular VLANs in response to source or destination addresses or other information.

DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using a set of general purpose computers operating under program control, and that modification of a set of general purpose computers to implement the process steps and data structures described herein would not require undue invention.

Multiple VLAN Architecture System

Figure 1:
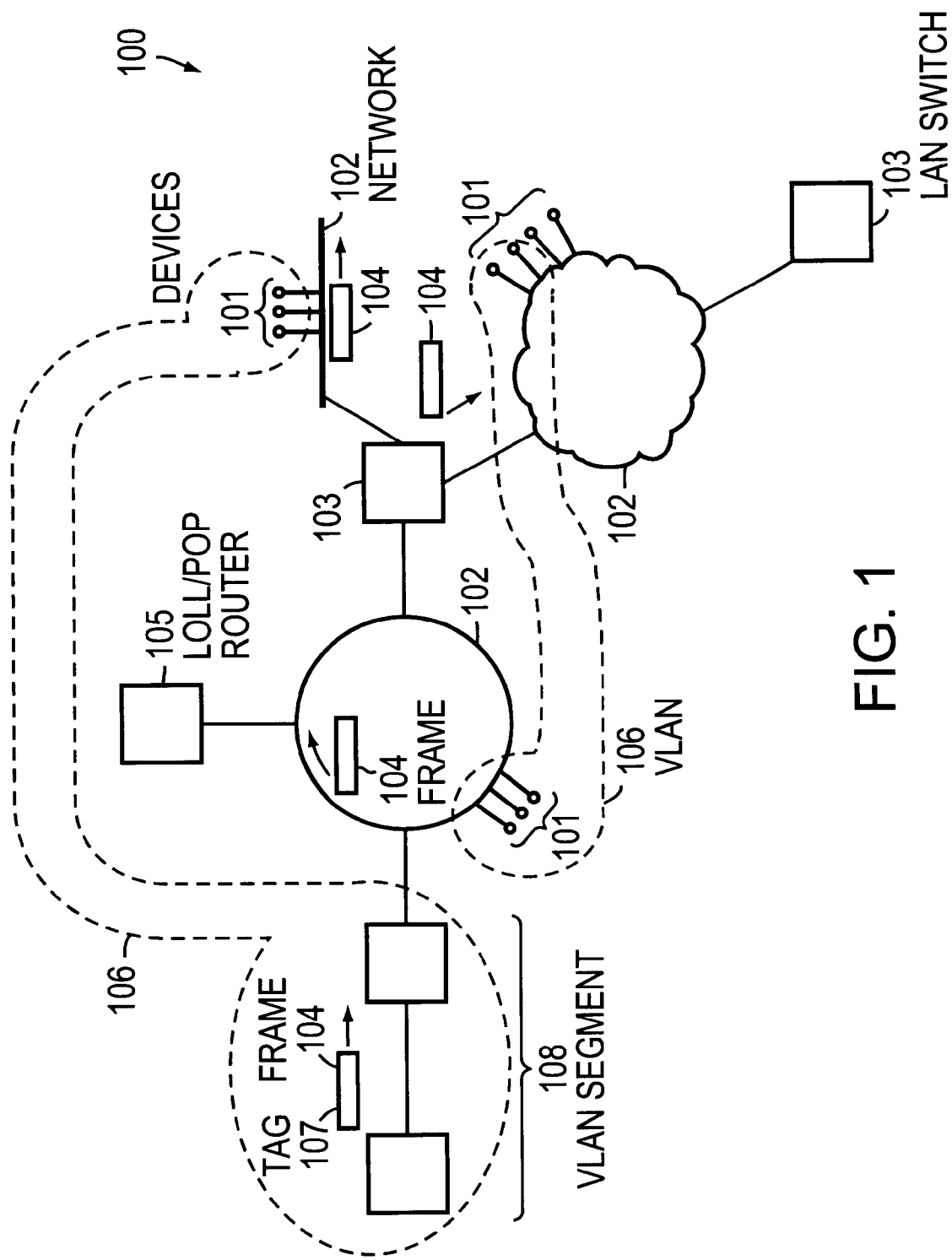
FIG. 1 is a diagram of a network having multiple VLANs.

FIG. 1 is a diagram of a network having multiple VLANs.

In an interconnected network 100, a set of devices 101 may be coupled to a plurality of physical networks 102. Each network 102 may comprise a local area network (LAN) such as an ethernet LAN, a token ring LAN, an FDDI network, or another LAN architecture. Each network 102 may transmit a set of frames 104 using one of a plurality of media access transmit protocols. Architectures for local area networks and for their media access transmit protocols are known in the art of networking.

The networks 102 are coupled using a set of LAN-switches 103. The LAN-switches 103 forward frames (using a level two protocol) or packets (using a level three protocol) among the networks 102. Each LAN-switch 103 is coupled to one or more networks 102. For example, one of the LAN-switches 103 may be coupled to two or more networks 102. LAN-switches are known in the art of networking.

The devices 101 are associated with a plurality of different VLAN technologies, and therefore may transmit frames using one of a plurality of VLAN transmit protocols. For example, each device 101 may be associated with a VLAN transmit protocol such as ATM LAN Emulation (LANE), IEEE 802.10, Cisco Catalyst™ Inter-Switch Links (ISLs), or another VLAN transmit protocol. Each device 101 may be associated with just one VLAN technology, or with a plurality of VLAN technologies.

The devices 101 are assigned to a plurality of VLANs 106, independent of their associated VLAN technologies. Each VLAN 106 need not comprise a single or homogeneous VLAN technology; moreover, each VLAN 106 is not subject to any requirement that all devices 101 on that VLAN 106 are proximate or even coupled using the same LAN or VLAN technology.

Those frames 104 to be transmitted on a particular VLAN segment 108 are identified with a tag 107 referencing that particular VLAN 106. As the frame 104 is forwarded between differing VLAN technologies, the tag 107 uses a tagging technique particular to that VLAN technology. For example, the tag 107 for the same VLAN 106 may be the character string 'GR" for LANE, the numeric value '1024' for IEEE 802.10, or the numeric value '10' for ISL.

The LAN-switches 103 are configured to (1) receive frames from a first VLAN associated with a first VLAN transmit protocol and encapsulated using a multiple-VLAN transmit protocol, (2) to remove the encapsulation, (3) to re-encapsulate the frames with a second VLAN transmit protocol, and (4) to transmit the re-encapsulated frames onto a second VLAN.

In alternative embodiments, the frames 104 may have implicit tagging. In this case, those frames 104 which are addressed from a first particular set of MAC addresses (or are otherwise identifiable from their frame headers) are designed as being for a first VLAN segment 108, while those frames 104 which are addressed from a second particular set of MAC addresses are designated as being for a second VLAN segment 108.

As described herein, the LAN-switches 103 may also include the capability to perform layer-3 routing. LAN-switches 103 which include such layer-3 routing may couple a set of frames 104 between virtual LANs (VLANs) as well as physical networks 102, it is possible for such a LAN-switch 103 to be coupled to only a single network 102, and to route the frames 104 found on that network 102 between different VLANs. In that circumstance, the LAN-switch 103 receives the frame 104 from one of the VLANs implemented by the network 102, and transmits the frame 104 onto another one of the VLANs implemented by the network 102. An example of one such LAN-switch 103, sometimes called a "lollypop router" 105, is shown in the figure.

Forwarding Frames Among Multiple VLANs

Figure 2:
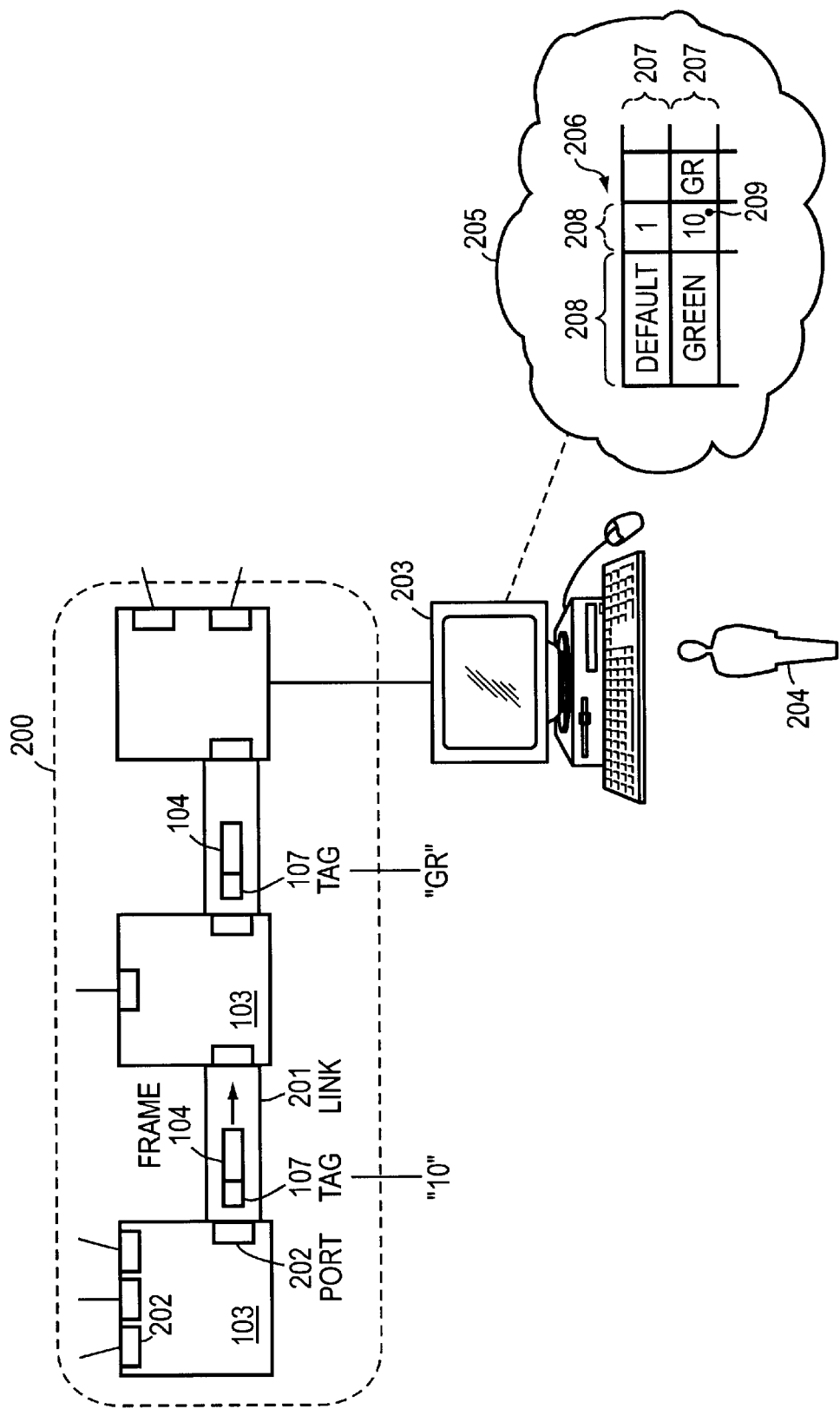
FIG. 2 is a diagram of a set of LAN-switches disposed for coupling messages between multiple VLANs.

FIG. 2 is a diagram of a set of LAN-switches disposed for coupling messages between multiple VLANs.

The set of LAN-switches 103 collectively comprises a subnet 200, in which pairs of the LAN-switches 103 are coupled by a set of links 201. Each link 201 comprises a physical network 102, so that a set of frames 104 may be coupled between pairs of LAN-switches 103. Each LAN-switch 103 comprises a set of ports 202 coupling the LAN-switch 103 to one of its links 201, and therefore to another LAN-switch 103.

Each LAN-switch 103 receives packets at each of its ports 202, and recognizes each VLAN 106 which might be received at port 202. When a frame 104 must be forwarded from a first VLAN segment 108 to a second VLAN segment 108, the LAN-switch 103 removes tags 107 (shown in the figure as the numeric value '10') for a first VLAN segment 108 and replaces them with tags 107 (shown in the figure as the character string value 'GR') for a second VLAN segment 108.

In a preferred embodiment, the LAN-switch 103 identifies the second VLAN segment 108 for the destination device 101 responsive to the output port 202 to which the frame 104 is routed. The port 202 may be one of three types shown in table 2-1.

TABLE 2-1

| Port Type | Treatment |
| --- | --- |
| static | Each frame from the port is for a particular VLAN which is statically configured for that port, regardless of the address or content of that frame |
| dynamic | The port may be assigned to one of a plurality of VLANs, one at a time. Each frame to or from the port is examined and the port is dynamically reassigned to a different VLAN in response to the address or content of that frame (For example, the port may be dynamically reassigned in response to the MAC address of the sending device, or in response to a layer three address.) |
| trunk | The port is assigned to a plurality of VLAN at once. Each frame to or from the port uses an encapsulation or related technique to tag that frame as for a particular VLAN. A VLAN trunk protocol causes each LAN-switch to transmit advertisements regarding, and acquire information about, VLANs for which that trunk port is configured. Thus, a new VLAN need only be configured for one LAN-switch in a management domain, as the VLAN trunk protocol will ultimately propagate that information to all LAN-switches in the management domain. The VLAN trunk protocol is described in further detail below. |

When the LAN-switch 103 receives a frame 104 on a static port 202, it knows that frame 104 must be for the VLAN 106 statically configured for that port 202. When the LAN-switch 103 transmits that frame 104 on another port 202 which is a trunk port 202, it must encapsulate the frame 104 with the appropriate outgoing tag 107 to indicate the VLAN 106.

When the LAN-switch 103 receives a frame 104 on a dynamic port 202, it knows that the frame 104 must be configured according to one of the plurality of VLANs 106 configured for that port 202, responsive to the address or contents (preferably the MAC address) of that frame 104. The LAN-switch 103 identifies the incoming VLAN 106 responsive to the MAC address of the frame 104. When the LAN-switch 103 transmits that frame 104 on another port 202 which is a trunk port 202, it must encapsulate the frame 104 with the appropriate outgoing tag 107 to indicate the VLAN 106.

When the LAN-switch 103 receives a frame 104 on a trunk port 202, it knows that the frame 104 must be encapsulated and that the encapsulated frame may be for one of a plurality of VLANs 106. The LAN-switch 103 identifies the VLAN 106 for the frame 104 responsive to the encapsulation header, and removes the encapsulation. When the LAN-switch 103 transmits that frame 104 on another trunk port 202, it must re-encapsulate that frame 104.

An network administrative workstation 203 is coupled to one LAN-switch 103 or elsewhere, and comprises a processor, program and data memory and mass storage, for executing application programs and for recording information, at least one input device (such as a keyboard or a pointing device such as a mouse) for receiving information from an operator 204, and at least one output device (such as a monitor or printer) for presenting information to the operator 204.

To identify the outgoing tag 107 which corresponds to the incoming tag 107, the LAN-switch 103 maintains a database 205 which is preferably also available at the network administrative workstation 203. The database 205 comprises a table 206; the table 206 comprises a set of rows 207 and a set of columns 208, with an entry 209 at the intersection of each row 207 and each column 208. The table 206 is indexed by a column 208 for a VLAN management ID; there is one row 207 for each VLAN 106 and one column 208 for each VLAN transmit protocol.

In a preferred embodiment, the VLAN management ID comprises a character string, such as "red" or "green". One VLAN management ID, "default", is reserved for an initial VLAN 106. LAN-switches 103 are configured for the "default" VLAN 106 when they are shipped from the factory. In a preferred embodiment, the VLAN management ID comprises an ASCII character string of eight characters or less.

In a preferred embodiment, the table 206 comprises is one column 208 for LANE, one column 208 for IEEE 802.10, and one column 208 for ISL. Each entry 209 comprises a tag 107 for the VLAN corresponding to its row 207 and the VLAN transmit protocol corresponding to its column 208. The data for each entry 209 has a data type which depends on the particular VLAN technology, such as numeric data, ASCII character data, or other data.

In a preferred embodiment, the ISL tag 107 for the "default" VLAN 106 is '1'. For IEEE 802.10, frames 104 for the "default" VLAN 106 may be transmitted as native frames without IEEE 802.10 encapsulation.

In a preferred embodiment, the database 205 also comprises information regarding properties associated with each VLAN 106 (such as, for example, whether the VLAN 106 has its operation suspended).

In alternative embodiments, the database 205 may be made available at other locations. For example, the database 205 may be recorded and updated separately at each LAN-switch 103, at a particular LAN-switch 103, or at a particular non-routing device 101.

Management Domains and Network Administration

Figure 3:
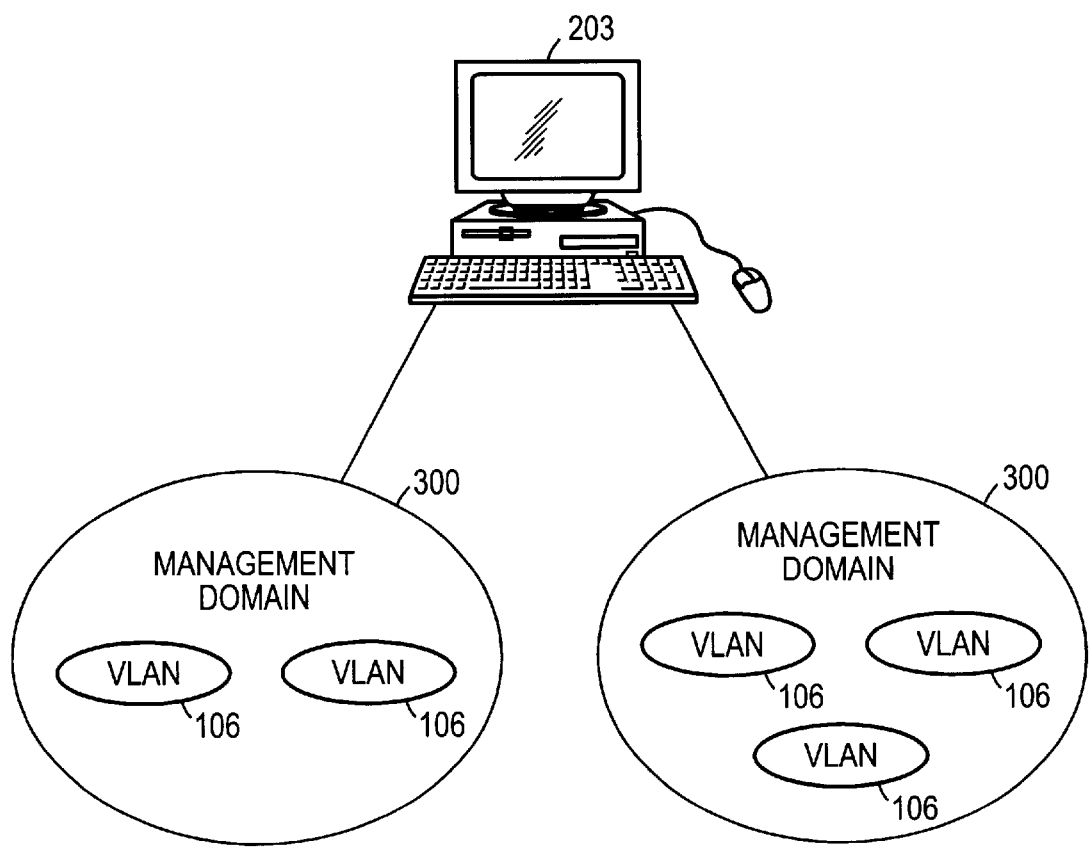
FIG. 3 is a diagram showing a relationship between multiple VLANs, management domains, and network administration.

FIG. 3 is a diagram showing a relationship between multiple VLANs, management domains, and network administration.

The network administrative workstation 203 controls a set of management domains 300, each of which comprises one or more VLANs 106. Each VLAN 106 comprises one or more devices 101 on one or more networks 102 in the interconnected network 100.

Each VLAN 106 must have a unique name within its management domain 300.

When two management domains 300 are coupled via a trunk port 202, the default behavior (prior to any additional configuration) is that no frames 104 are forwarded between the two management domains 300. However, the respective ports 202 may be configured using the network administrative workstation 203 to forward frames 104 for specific VLANs 106.

When two management domains 300 are coupled via a non-trunk port 202 (thus, via a static port 202 or a dynamic port 202), the respective ports 202 may be configured using the network administrative workstation 203 to forward frames 104 for specific VLANs 106.

When frames 104 are transmitted across a trunk port 202 between a first management domain 300 and a second management domain 300, the LAN-switch 103 must have a mapping between the source VLAN 106 in the first management domain 300 and the destination VLAN 106 in the second management domain 300.

Each LAN-switch 103 maintains a list of VLANs 106 which are valid in its management domain 300. This list is associated at each LAN-switch 103 with a configuration revision number; the configuration revision number is updated whenever a change is made to the configuration for that management domain 300. Thus, a LAN-switch 103 can compare its configuration revision number with the new configuration to determine which is more recent.

When they are initially shipped from the factory, LAN-switches 103 are configured in a "no-management-domain" state. In this state, the LAN-switch 103 does not belong to any particular management domain 300 and will update its database to learn about new VLANs 106 from all VLAN trunk protocol advertisements it receives. When a LAN-switch 103 is configured for a particular management domain 300, it will ignore advertisements from different management domains 300 and it will check advertisements from the same management domain 300 for consistency.

When a LAN-switch 103 learns about a VLAN 106, it will have received frames 104 from that VLAN 106 on any trunk port 202, and will forward those frames 104 to all of its other trunk ports 202 (if any). This behavior may be altered by reconfiguring the LAN-switch 103 using the network administration workstation 203 to disable one or more VLANs 106 for a particular trunk port 202.

Multiple VLAN Network Administration

The operator 204 at the network administrative workstation 203 may alter the database 205 and cause those alterations to be propagated to the LAN-switches 103. Table 3-1 shows the changes which the operator 204 at the network administrative workstation 203 may make.

TABLE 3-1

| Change | Effect |
|---|---|
| create a VLAN | A new VLAN is created. A record is created for the new VLAN; a new VLAN management ID is created; entries are made for the new VLAN for each VLAN technology |
| delete a VLAN | An existing VLAN is removed from the configuration for the management domain. The deleted VLAN's entries in the database at the network administration workstation are purged and any ports configured for the deleted VLAN are automatically disabled. In an alternative embodiment, the deleted VLAN is only purged from the database after all ports configured for the deleted VLAN are reconfigured for another VLAN. The "default" VLAN cannot be deleted |
| suspend a VLAN | An existing VLAN has its operation suspended. All traffic for the suspended VLAN is turned off for the duration of the suspension. (This function might be useful, for example, if traffic for the suspended VLAN was disrupting the network.) All ports configured for the suspended VLAN are disabled for the duration of the suspension. The "default" VLAN cannot be suspended. |
| resume a VLAN | A suspended VLAN has its suspension terminated. All ports for the resumed VLAN are re-enabled and traffic is allowed to flow for the resumed VLAN. |

Those skilled in the art will recognize, after perusal of this application, that other and further management functions would not require undue experimentation, and are within the scope and spirit of the invention.

VLAN Protocols and Message Formats

Figure 4:
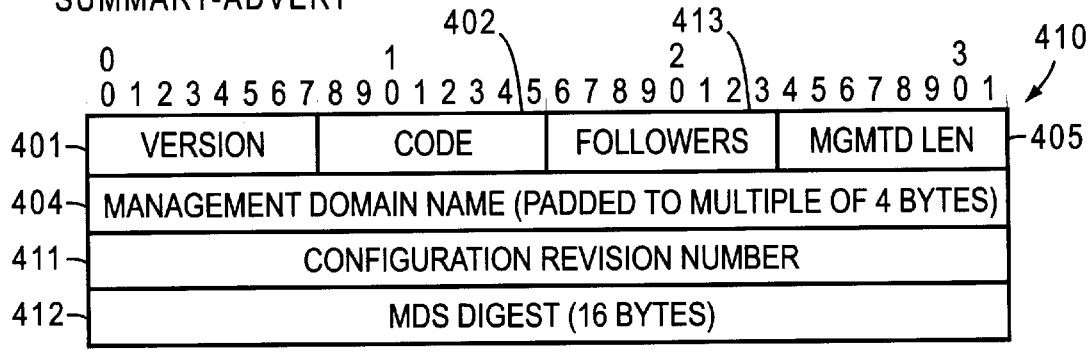
FIG. 4 is a diagram showing message formats for use in a VLAN protocol.
Figure 4:
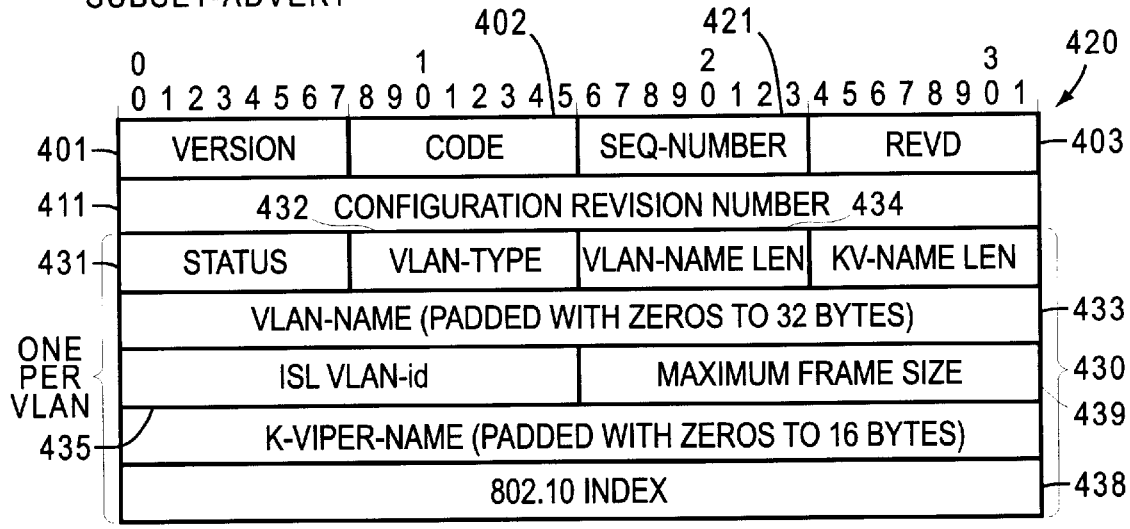
Figure 4:
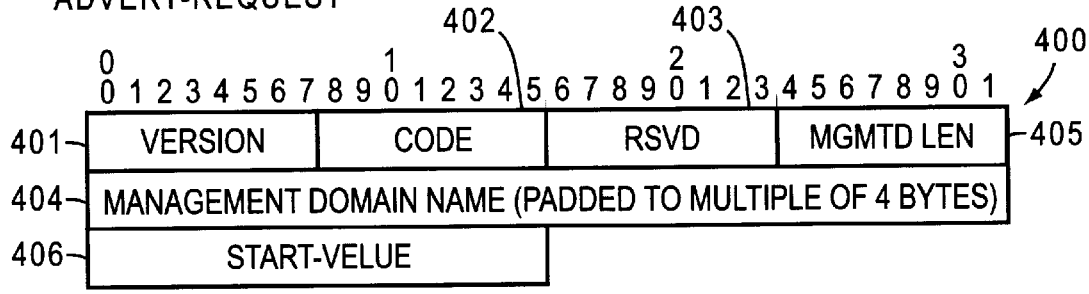

FIG. 4 is a diagram showing message formats for use in VLAN protocols.

VLAN Trunk Protocol

Each LAN-switch 103 transmits advertisements regarding all VLANs 106 about which it knows, and possibly other information global to the management domain 300. Advertisements are transmitted via the "default" VLAN 106; thus, only one advertisement is transmitted for each trunk port 202. Advertisements are transmitted as multicast frames 104 but not forwarded using normal bridging techniques.

Each LAN-switch 103 maintains a configuration revision number for each management domain 300 for which it is configured. The configuration revision number is an unsigned 32 bit value, which is initially set to zero and is incremented by one for each modification or reconfiguration at the LAN-switch 103 until the maximum value of 4,294,967,295 (hexadecimal 'FFFF FFFF') is reached, at which point the configuration revision number is wrapped around back to zero.

When a LAN-switch 103 receives an advertisement and it is not configured for any management domain 300, it updates its database 205 from that advertisement. When a LAN-switch 103 receives an advertisement and it is configured for one or more particular management domains 300, it authenticates that advertisement using its current configuration revision number for the appropriate management domain 300. It the advertisement is authentic and its configuration revision number exceeds the LAN-switch's current configuration revision number, the LAN-switch 103 updates its database 205 from that advertisement; otherwise the LAN-switch 103 ignores the advertisement.

The configuration revision number A is deemed to be less than the configuration revision number B if and only if ((A<B and (B-A)<2,147,483,648)

or (A>B and (A-B)>2,147,483,648))

The types of advertisement messages are shown in table 4-1.

TABLE 4-1

| Port Type | Treatment |
|---|---|
| Advert-Request | This message requests that an advertisement be sent. |
| Summary Advert | This message provides the management domain, configuration revision number, and checksum for the advertisement. The Summary-Advert message is followed by zero or more Subset-Advert messages as appropriate. |
| Subset-Advert | This message comprises all advertised information for one or more VLANs. Each Subset-Advert message is labelled with a sequence number in case more than one Subset-Advert message is sent. |

The Advert-Request message 400 comprises a VLAN trunk protocol version number 401 (1 byte, which is always '1'), a type of message code 402 (1 byte, which is preferably '3' for the Advert-Request message 400), a reserved byte 403, a management domain name 404 (variable length, but preferably a multiple of 4 bytes), a length value 405 (1 byte) for the management domain name 404, and a start value 406 (2 bytes).

The Summary-Advert message 410 comprises the VLAN trunk protocol version number 401, the type of message code 402 (which is preferably '1'for the Summary-Advert message 410), the management domain name 404 (variable length, but preferably a multiple of 4 bytes), a length value 405 (1 byte) for the management domain name 404, a configuration revision number 411 (4 bytes), an MD5 digest value 412 (4 bytes), and a followers value 413 (1 byte).

The Subset-Advert message 420 comprises the VLAN trunk protocol version number 401, the type of message code 402 (which is preferably '2' for the Subset-Advert message 420), a reserved byte 403, the configuration revision number 411, a sequence number 421 (1 byte), and a sequence of VLAN blocks 430.

Each VLAN block 430 comprises a status value 431 (1 byte), a VLAN type value 432 (1 byte), a VLAN name 433 (variable length, but preferably a multiple of 4 bytes), a length value 434 (1 byte) for the VLAN name 433, an ISL VLAN identifier 435 (2 bytes), an IEEE 802.10 index value 438, and a maximum frame size value 439.

The start value 406 is used in the event that the LAN-switch 103 does not desire all VLANs 106 to be advertised to it. In the actual advertisement, the Subset-Advert messages 420 are ordered by ISL VLAN identifier 435. The start value 406 indicates from which ISL VLAN identifier 435 to start; all VLANs 106 which precede the start value 406 are not advertised. If the start value 406 is zero, all VLANs 106 are advertised.

Advertisements are authenticated; learning only occurs from authentic advertisements. Each advertisement comprises a checksum, preferably the MD5 digest value 412, which is computed using a one-way cryptographic hash function (the MD5 digest function) of the concatenation of (1) the Summary-Advert message 410 with the followers value 413 replaced with a zero value, (2) the VLAN blocks 430 ordered by ISL VLAN identifier 435, and 3) a "secret value". The default secret value is all zeros, thus providing non-secure but immediately compatible operation. The secret value may be configured for each LAN-switch 103 using the network administrative workstation 203, thus providing secure operation. Since each advertisement comprises a new configuration revision number 411, the MD5 digest value 412 cannot be repeated until the configuration revision number 411 is itself repeated.

The followers value 413 indicates how many Subset-Advert messages 420 follow the Summary-Advert message 410. The number of Subset-Advert messages 420 which follow the Summary-Advert message 410 are shown in table 4-2.

TABLE 4-2

| Reason for Sending Advertisement | Number of Followers |
|---|---|
| Neither this LAN-switch or any other LAN-switch has recently (within the timeout period) sent an advertisement. | zero |
| A configuration change has been made. | the minimum number required to contain all information on exactly those VLANs which have changed, ordered by ISL VLAN identifier |
| An Advert-Request message for information for all VLANs was received. | the minimum number required to contain all information on all VLANs, ordered by ISL VLAN identifier |
| An Advert-Request message for information about a subset of all VLANs was received. | the minimum number required to contain all information on all VLANs except those which were not requested, ordered by ISL VLAN identifier |

The VLAN type value 432 indicates what type the VLAN 106 is; ethernet of IEEE 802.3, token ring or IEEE 802.5, or FDDI.

The maximum frame size value 439 indicates the maximum frame size for the particular VLAN 106.

An Advert-Request message 400 is sent in the following cases:

when the LAN-switch 103 is rebooted.

when the LAN-switch 103 receives a Subset-Advert message 420 having a configuration revision number 411 higher than the LAN-switch's own configuration revision number 411.

when the LAN-switch 103 receives a Summary-Advert message 410 having a configuration revision number 411 higher than the LAN-switch's own configuration revision number 411, and followed by zero Subset-Advert messages 420.

when the LAN-switch 103 does not receive the expected number of Subset-Advert messages 420 within a short period after receiving a Summary-Advert message 410 having a configuration revision number 411 higher than the LAN-switch's own configuration revision number 411. In this case, the Advert-Request message 400 is set to request only the missing Subset-Advert messages 420, by setting the start value 406 to one more than the highest ISL VLAN identifier 435 received.

when the LAN-switch 103 receives a Summary-Advert message 410 having a configuration revision number 411 more than one value higher than the LAN-switch's own configuration revision number 411.

An advertisement, comprising a Summary-Advert message 410 and zero or more Subset-Advert messages 420, is sent in the following cases:

immediately after its configuration revision number is modified (thus, immediately after any configuration change);

periodically on any trunk port 202 for which it has not sent an advertisement or received an advertisement matching its own, for a configurable timeout period, preferably about five minutes. The actual time for sending advertisements is jittred (modified by a small random or pseudorandom value) to avoid synchronization effects. Periodic advertisements can be disabled using the network administrative workstation 203.

when a request for an advertisement is received. In this case, the timeout period is truncated to a small random or pseudorandom value.

In a preferred embodiment, the timeout for sending an advertisement is between about 2 minutes and about 10 minutes. Whenever this timeout is started, a pseudorandom value of less than about 1 second is added to it. When a consistent advertisement is received, the timeout is restarted without sending any advertisement. When an Advert-Request message 400 is received the timeout is truncated to the value of the most recent pseudorandom value.

Those skilled in the art will recognize, after perusal of this application, that the VLAN trunk protocol may be used to distribute other and further types of information, that such activity would not require undue experimentation, and that such activity is within the scope and spirit of the invention. For example, such other and further types of information could include the following:

port configuration information—whether a particular port 202 is a static port 202, dynamic port 202, or a trunk port 202; or dynamic assignment configuration information—either (1) which VLAN 106 a dynamic port 202 is associated with, or (2) a mapping between a layer three protocol address space, or a subspace thereof, and which VLAN 106 a dynamic port 202 should be associated with.

VCS Protocol

A VLAN configuration server comprises local information about VLANs 106, including port configuration information and dynamic assignment configuration information.

In a preferred embodiment, the VLAN configuration server is available at the network administrative workstation 203, but in alternative embodiments, may be a separate device 101 or may be distributed over several LAN-switches 103 or other devices 101.

To configure its ports 202, each LAN-switch 103 sends a message to the VCS to request configuration information. If the LAN-switch 103 is coupled to a ATM network 102, it also attempts, for each VLAN 106 it knows about, to join the LANE emulated-LAN (ELAN) having the same name.

For static ports 202, the LAN-switch 103 receives configuration information specifying with which VLAN 106 the port 202 is associated.

For dynamic ports 202, the LAN-switch 103 receives configuration information specifying a mapping to VLANs 106 for MAC addresses for sending devices 101 for frames 104.

The message requesting configuring information is sent directly to the VCS if the LAN-switch 103 is not coupled to a ATM network 102. Otherwise, the message is encapsulated using the LANE protocol and sent to a LANE configuration server (LECS).

If the VCS (or LECS) responds for a port 202 with a VLAN name (or ELAN name) which is known to the LAN-switch 103, the port 202 is assigned to the VLAN 106 with that name.

If the VCS (or LECS) responds for a port 202 with a refusal, that port 202 is disabled.

If the VCS (or LECS) responds for a port 202 with a VLAN name (or ELAN name) which is not known to the LAN-switch 103, or if the VCS (or LECS) does not respond after a number of retries, or if the VCS (or LECS) cannot be reached, the LAN-switch 103 retries the request at periodic intervals.

However, if the LAN-switch 103 has local configuration information which maps a source MAC addresses to VLANs 106 for a dynamic port 202, it uses that local configuration information to reassign the dynamic port 202 in response to source MAC addresses.

Alternative Embodiments

Although preferred embodiments are disclosed herein, many variations are possible which remain within the concept, scope and spirit of the invention, and these variations would become clear to those skilled in the art after perusal of this application.

We claim:

1. A LAN-switch that receives and routes packets, the switch comprising means for routing from a first VLAN to a second VLAN, said means for routing comprising means for replacing a first VLAN encapsulation that identifies a destination with a second VLAN encapsulation that identifies the destination, wherein the first VLAN encapsulations and said second VLAN encapsulation are different.

2. A switch as in claim 1, wherein said first VLAN encapsulation is replaced with said second VLAN encapsulation by removing said first VLAN encapsulation and adding said second VLAN encapsulation.

3. A switch as in claim 1, wherein the switch comprises a plurality of ports.

4. A switch as in claim 1, comprising means for deleting one of said multiple different VLANs.

5. A switch as in claim 1, further including means for:
receiving a packet from a source coupled to said first VLAN; and
transmitting said packet to a destination coupled to said second VLAN.

6. A switch as in claim 1, wherein the switch further includes:

a plurality of dynamic ports; and means for reassociating one of said plurality of dynamic ports from said first VLAN to said second VLAN.

7. A switch as in claim 1, wherein the switch also includes:

means for assigning at least one packet to a particular VLAN responsive to a MAC address.

8. A method for receiving and routing packets at a LAN-switch, the method comprising:

routing from a first VLAN to a second VLAN, the routing comprising replacing at the switch a first VLAN encapsulation of at least one packet that identifies a destination with a second VLAN encapsulation that identifies the destination, wherein said first VLAN encapsulation and said second VLAN encapsulation are different.

9. A method as in claim 8, wherein said first VLAN encapsulation is replaced with said second VLAN encapsulation by removing said first VLAN encapsulation and adding said second VLAN encapsulation.

10. A method as in claim 8, also comprising deleting one of said multiple different VLANs.

11. A method as in claim 8, further including:

receiving the packet from a source coupled to said first VLAN; and transmitting said packet to a destination coupled to said second VLAN.

12. A method as in claim 8, wherein the method further includes reassociating one of a plurality of dynamic ports of the switch from said first VLAN to said second VLAN.

13. A method as in claim 8, wherein the method also includes:

assigning said at least one packet to a particular VLAN responsive to a MAC address.

14. A LAN-switch that receives and routes packets, the switch comprising a first mechanism configured to route at least one packet from a first VLAN to a second VLAN, said mechanism comprising a second mechanism configured to replace a first VLAN encapsulation that identifies a destination with a second VLAN encapsulation that identifies the destination, wherein said first VLAN encapsulation and said second VLAN encapsulation are different.

15. A switch as in claim 14, wherein said first VLAN encapsulation is replaced with said second VLAN encapsulation by removing said first VLAN encapsulation and adding said second VLAN encapsulation.

16. A switch as in claim 14, wherein the switch comprises a plurality of ports.

17. A switch as in claim 14, comprising a third mechanism configured to delete one of said multiple different VLANs.

18. A switch as in claim 14, further including:

a fourth mechanism configured to receive a packet received from a source coupled to said first VLAN; and a fifth mechanism configured to transmit said received packet to a destination coupled to said second VLAN.

19. A switch as in claim 14, wherein the switch further includes:

a plurality of dynamic ports; and a sixth mechanism configured to reassociate one of said plurality of dynamic ports from said first VLAN to said second VLAN.

20. A switch as in claim 14, wherein the switch also includes:

an association mechanism configured to assign said at least one packet to a particular VLAN responsive to a MAC address.

21. Computer readable memory comprising computer-executable program instructions that when executed cause a LAN-switch to route at least one packet from a first VLAN to a second VLAN, said instructions also comprising instructions for replacing a first VLAN encapsulation that identifies a destination with a second VLAN encapsulation that identifies the destination, wherein said first VLAN encapsulation and said second VLAN encapsulation are different.

22. Memory as in claim 21, wherein said first VLAN encapsulation is replaced with said second VLAN encapsulation by removing said first VLAN encapsulation and adding said second VLAN encapsulation.

23. Memory as in claim 21, wherein the switch comprises a plurality of ports.

24. Memory as in claim 21, also comprising instructions for deleting one of said multiple different VLANs.

25. Memory as in claim 21, further including instructions for:

receiving a packet from a source coupled to said first VLAN; and transmitting said packet to a destination coupled to said second VLAN.

26. Memory as in claim 21, further including instructions for:

reassociating one of a plurality of dynamic ports of the switch from said first VLAN to said second VLAN.

27. Memory as in claim 21, further including instructions for:

assigning said at least one packet to a particular VLAN responsive to a MAC address.

* * * * *

UNITED STATES PATENT AND TRADEMARK OFFICE
CERTIFICATE OF CORRECTION

PATENT NO. : 6,304,901 B1
DATED : October 16, 2001
INVENTOR(S) : McCloghrie et al.

It is certified that error appears in the above-identified patent and that said Letters Patent is hereby corrected as shown below:

<u>Title page,</u>
Item [75], Inventors: the third inventor should read -- Christopher Young --

Signed and Sealed this

Eighteenth Day of June, 2002

*Attest:*

*Attesting Officer*

JAMES E. ROGAN
*Director of the United States Patent and Trademark Office*